(No Model.) 2 Sheets—Sheet 1.
W. MASON.
WIRE OR CABLE TIGHTENER.
No. 433,799. Patented Aug. 5, 1890.
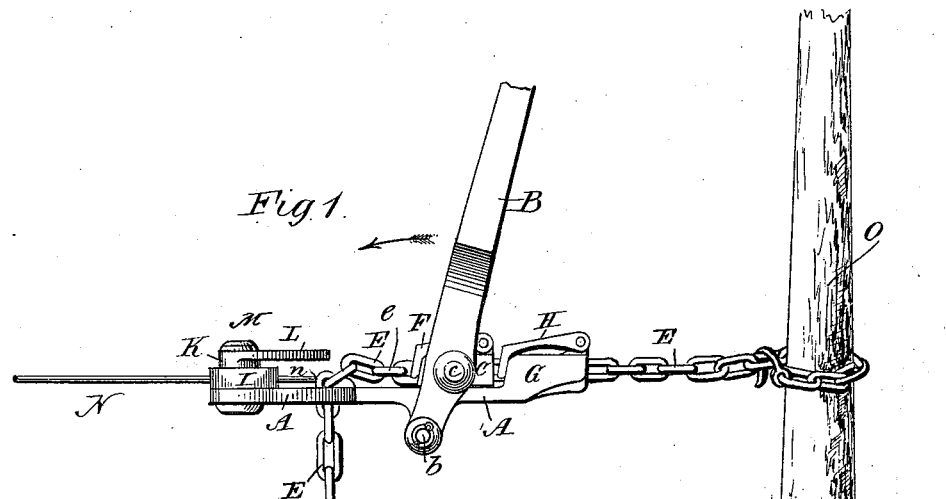
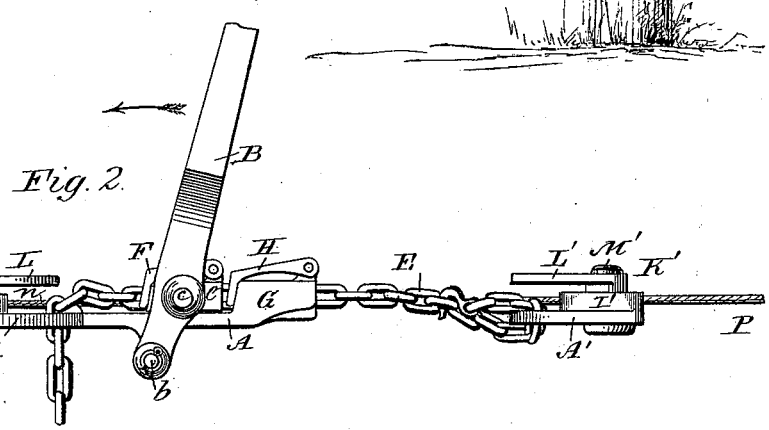
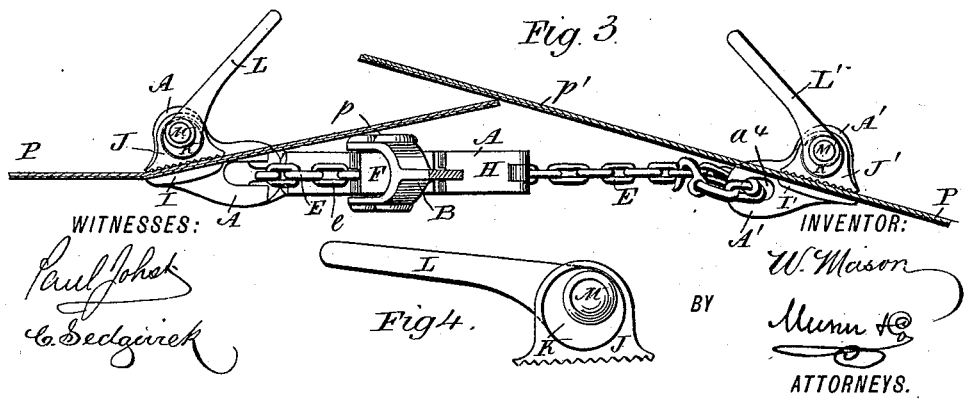

(No Model.) 2 Sheets—Sheet 2.

W. MASON.
WIRE OR CABLE TIGHTENER.

No. 433,799. Patented Aug. 5, 1890.

WITNESSES:
Paul Johst
C. Sedgwick

INVENTOR:
W. Mason
BY Munn & Co
ATTORNEYS.

UNITED STATES PATENT OFFICE.

WILLIAM MASON, OF HAMILTON, VICTORIA.

WIRE OR CABLE TIGHTENER.

SPECIFICATION forming part of Letters Patent No. 433,799, dated August 5, 1890.

Application filed January 3, 1890. Serial No. 335,834. (No model.)

*To all whom it may concern:*

Be it known that I, WILLIAM MASON, of Hamilton, Victoria, Australia, have invented a new and Improved Wire or Cable Tightener, of which the following is a full, clear, and exact description.

My invention relates to a device for stretching or tightening fence-wires, or ropes or cables on shipboard or elsewhere prior to making the wires or ropes or cables fast or to joining or splicing them when broken.

The invention has for its object to provide a simple, inexpensive, and efficient machine or apparatus of this character.

The invention consists in certain novel features of construction and combinations of parts of the wire or cable tightener, all as hereinafter described and claimed.

Reference is to be had to the accompanying drawings, forming a part of this specification, in which similar letters of reference indicate corresponding parts in all the figures.

Figure 5:
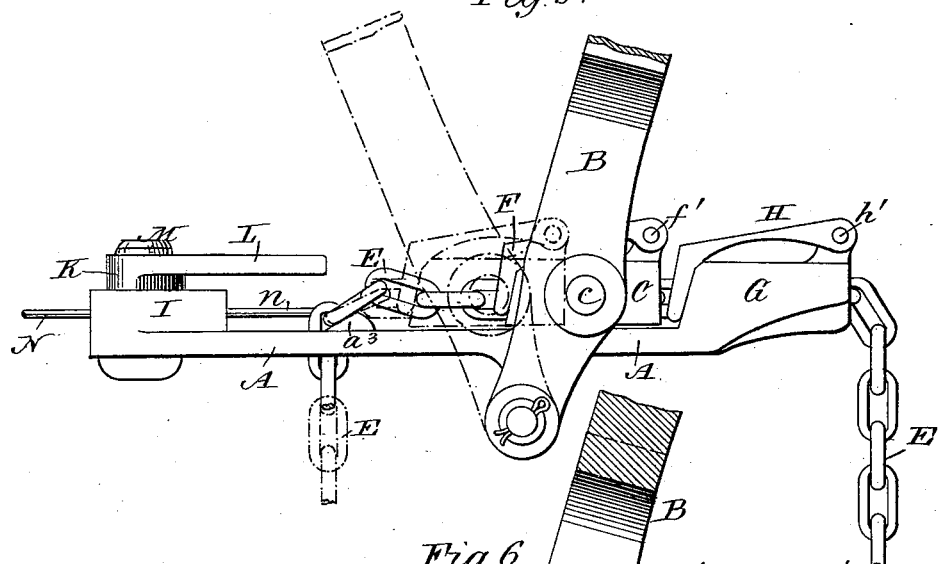
Figure 6:
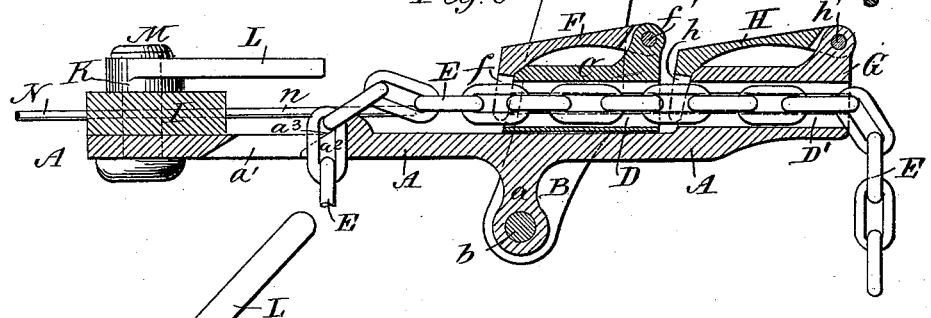
Figure 7:
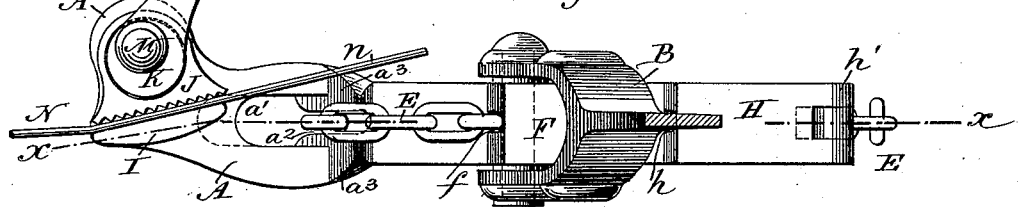
Figure 8:
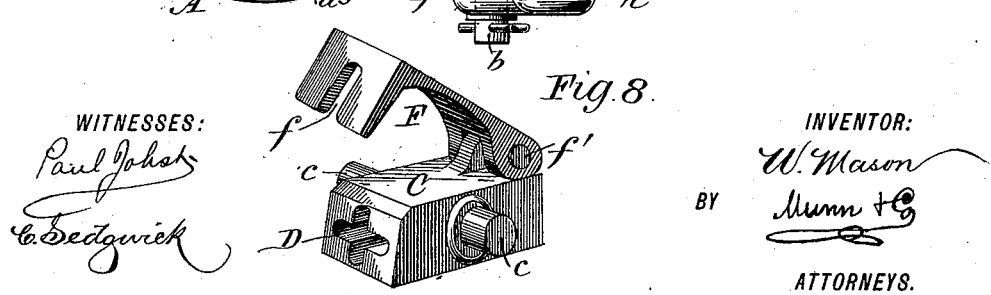

Figure 1 is a side elevation showing my improvement applied to use for tightening fence-wires. Fig. 2 illustrates in side elevation how the tightener is used in making a splice-joint in a broken wire or cable. Fig. 3 is a plan view of the devices shown in Fig. 2. Fig. 4 is a detail rear side elevation of one of the eccentric wire or cable grips of the device. Fig. 5 is an enlarged side elevation of the tightener. Fig. 6 is a longitudinal sectional side view thereof taken on the line $x\ x$ in Fig. 7. Fig. 7 is a plan view of the tightener; and Fig. 8 is a perspective view of the movable pawl-block, which in use is connected to the main operating-lever of the tightener.

The operating-lever of the device is broken away at the outer end wherever shown in the drawings.

The tightener is made with a body portion or stock A, which is made preferably of cast malleable iron, and has a bottom lug $a$, in which is fitted the fulcrum-pin $b$ of the forked main operating-lever B, which engages with the side trunnions $c$ of a metal block C, adapted for movement backward and forward on the stock. This block is provided with a central lengthwise opening or slot D, made in cross form, so as to receive the vertically and horizontally disposed links of a tightening-chain E, which passes through the block, and is also passed through an opening $a'$ in the stock. This opening is contracted in width at its end nearest the lever to provide a narrower notch or slot $a^2$ only wide enough to allow one of the links of the chain E to pass through it edgewise. A beveled or inclined surface $a^3$, formed on the stock A at and above each side of the notch $a^2$, guides the following link flatwise while the first-named edgewise-set link is passing through the notch, and when the flatwise link has slipped forward off of the inclined face $a^3$ the following edgewise link will sink farther into the notch $a^2$ and allow the flatwise link in front of it to swing down below the stock at the notch, where it will lock against the stock underneath to prevent back slip of the chain. (See Figs. 3 and 6 of the drawings.)

To the back end of the main block C is pivoted at $f'$ a pawl F, which has a notch $f$ in its free end, enabling it to slip down astride of a vertically-disposed link and assuring its catching upon the back end of the next preceding horizontal or flat link. At the back end of the stock A is formed a box G, which is provided with a central lengthwise slot D', like the slot D of the block C, and a pawl H, like the one F of block C, is pivoted at $h'$ to the back end of the box. This pawl H will automatically be lifted by successive horizontal or flat links of the pulling-chain and will lock behind them after they pass forward, while the vertical links may pass freely through the vertical slot $h$ in the free end of the pawl. The pawl H thus also retains the chain E against backward movement, while the lever B, with the block C and pawl F, are carried backward to engage said pawl F with or behind another flat link of the pulling-chain.

At its forward end the stock A is provided with a lug I, which forms a fixed jaw of the wire or cable clamp, the movable jaw J of which is fitted onto an eccentric block-bearing K, which is provided with a fixed handle L. The eccentric-bearing K is placed or held loosely, so as to turn upon a pin or stud M, which is fixed in the stock A of the tightener. The edge of the movable jaw J is preferably serrated transversely to assure a firm hold of a wire or cable clamped between the two jaws I J. (See Figs. 3, 4, and 7 of the drawings.) The movable jaw is tightened to the wire by swinging the handle L of its eccentric-bearing K toward the main lever B of the tightener, and the grip on the wire will be relaxed by swinging the handle away from the main lever.

As thus far described the device is adapted for stretching one end of a wire or cable while the chain E is hitched to a fence-post or tree or any other fixed object; but when a broken wire or cable is to be pieced or spliced out, or is to be joined again when broken, I employ with the stock A and connected chain and lever and pawls above described an auxiliary clamp for one end of the broken wire or cable. This clamp consists of a stock or plate A', having at one end a hole or eye $a^4$ to receive the chain E, and provided at its other end with a fixed lug or jaw I', opposite which the plate has a fixed pin M', on which is loosely placed an eccentric-bearing K', which has a lever-handle L', and on this bearing is loosely mounted the movable grip-jaw J', all as shown in Figs. 2 and 3 of the drawings. These parts I' J' K' L' M' are substantially like the clamps I J K L M on the main stock A of the tightener.

The operation of the device is as follows: When a wire—a fence-wire N, for instance—or a cable of any kind is to be stretched from one end only prior to making it fast to a post or other support, the chain E will be made fast to a straining-post or back-stay O, and after the free end $n$ of the wire is clamped by the jaw J, tightened by the eccentric-lever K L, the main lever B will be worked backward and forward on its fulcrum $b$, and on the forward stroke in direction of the arrow the pawl F of the block C will engage the back end of one of the flat links $e$ of the chain E and will draw the chain through the box G as the pawl H slips over the chain, and during this time the length of the chain between the tightener and post O will shorten and the wire N will be correspondingly drawn up or tightened. As the lever B is moved backward or toward the post O, the pawl H will hold the chain as the pawl F slips over it into position to engage another flat link $e$ the next time the lever B is moved forward. If for any reason the pawl H should fail to act, the chain would be securely locked against backward slip by the engagement of one of its flat links $e$ with the under side of the stock A next its notch $a^2$. When by repeated reciprocations of the lever B the slack of the wire or cable N has been taken up and the lever is released, the chain E will then be held against backward slip at three points or by the pawls F H and under the stock-notch $a^2$; hence the wire will be securely held while its free end is fastened to a post or other intended anchorage. This use of the tightener is illustrated in Fig. 1 of the drawings.

When two parted ends of a fence-wire, rope, or cable P are to be spliced together, either directly or by the interposition of another short piece, one end $p$ of the wire will be clamped between the jaws I J on the main stock A, and the other end $p'$ will be clamped between the jaws I' J' of the auxiliary clamp device, which will be caught by its loop or eye $a^4$ in a bight of the chain E, as shown in Figs. 2 and 3 of the drawings. With the parts thus adjusted it is only necessary to reciprocate the main lever B, and thereby draw the chain toward the clamps I J, and consequently bring the two ends $p$ $p'$ of the wire or cable toward each other to allow them to be spliced at leisure.

Whichever way the tightener device is used, it may be worked by one man, who may also easily secure the wire or cable stretched by it. The tightener is specially adapted for stretching fence-wires or for stretching ropes or cables aboard ship; but it is applicable for use in many other situations, as will readily be understood.

Having thus described my invention, what I claim as new, and desire to secure by Letters Patent, is—

1. The combination, in a wire or cable tightener, of a stock, a lever fulcrumed thereto, a movable block having a cross-shaped longitudinal slot and connected to the lever, a chain in the block-slot, a pawl on the block engaging the chain, and a detent for the chain at the stock, substantially as herein set forth.

2. The combination, in a wire or cable tightener, of a stock, a lever fulcrumed thereto, a movable block having a cross-shaped longitudinal slot and connected to the lever, a chain on the block-slot, a pawl on the block engaging the chain, a detent for the chain at the stock, and a wire or cable clamp on the stock, substantially as herein set forth.

3. The combination, in a wire or cable tightener, of a stock provided at its forward end with a wire-clamping device and provided at its rear end with a fixed chain-guide box having a cross-shaped longitudinal slot, a lever fulcrumed to the stock, a movable block connected to the lever and provided with a pawl and a cross-shaped longitudinal slot, and a chain passed through the fixed box and movable block and adapted for engagement by the pawl of the movable block, substantially as herein set forth.

4. The combination, in a wire or cable tightener, of a stock provided at its forward end with a wire-clamping device and provided at its rear end with a fixed chain-guide box having a cross-shaped longitudinal slot, a lever fulcrumed to the stock, a movable block connected to the lever and having a cross-shaped longitudinal slot, a chain passed through the fixed box and movable block, and pawls on said box and block adapted to engage the chain, substantially as herein set forth.

5. The combination, in a wire or cable tightener, of a stock provided with an opening $a'$ and notch $a^2$, a lever fulcrumed on the stock, a movable block having a cross-shaped longitudinal slot and connected to the lever, a chain in the block-slot adapted to underlock at the stock-notch $a^2$, and a pawl operating the chain from the lever, substantially as herein set forth.

6. The combination, in a wire or cable tightener, of a stock, a lever fulcrumed thereto, a movable block having a cross-shaped longitudinal slot and connected to the lever, a chain in the block-slot, and a pawl operating the chain from the lever, said stock provided with an opening $a'$, a notch $a^2$, and an inclined face $a^3$ for guidance and locking of the chain, substantially as herein set forth.

7. The combination, in a wire or cable tightener, of a stock provided with an opening $a'$ and notch $a^2$, a lever fulcrumed on the stock, a movable block having a cross-shaped longitudinal slot and connected to the lever, a chain in the block-slot adapted to underlock the stock at its notch $a^2$, a pawl operating the chain from the lever, and a wire or cable clamp on the stock, substantially as herein set forth.

8. The combination, in a wire or cable tightener, of a stock provided at its forward end with a wire-clamping device and also with an opening $a'$ and notch $a^2$, and provided at its rear end with a fixed chain-guide box having a cross-shaped longitudinal slot, a lever fulcrumed to the stock, a movable block connected to the lever, a chain passed through the fixed box and movable block, and pawls on the box and block adapted to engage the chain, substantially as herein set forth.

9. In a wire or cable tightener, the combination, with a stock, of a lever fulcrumed thereto, a movable block having a cross-shaped longitudinal slot and connected to the lever, a chain in the block-slot, a pawl operating the chain from the lever, a detent for the chain, and a wire or cable clamp consisting of a fixed jaw on the stock, an eccentric-bearing journaled to the stock opposite said jaw, and a movable jaw on the eccentric-bearing, substantially as herein set forth.

10. In a wire or cable tightener, the combination, with a stock, of a lever fulcrumed thereto, a movable block having a cross-shaped longitudinal slot, a chain in the block-slot, a pawl operating the chain from the lever, a detent at the stock for the chain, a wire or cable clamp on the stock, and an auxiliary wire-clamp adapted for connection to the chain, substantially as described, whereby both ends of a wire or cable may be drawn toward each other to be joined or spliced, as set forth.

11. In a wire or cable tightener, the combination, with a stock, of a lever fulcrumed thereto, a movable block having a cross-shaped longitudinal slot and connected to the lever, a chain in the block-slot, a pawl operating the chain from the lever, a detent at the stock for the chain, a wire or cable clamp on the stock, and an auxiliary wire-clamp consisting of a plate adapted for connection to the chain and provided with a fixed jaw, an eccentric-bearing journaled to the plate opposite said fixed jaw, and a movable jaw on the eccentric-bearing, substantially as described, for the purposes set forth.

WILLIAM MASON.

Witnesses:
WALTER SMYTHE BAYSTON,
WILLIAM GUEST HOLDEN.